United States Patent [19]

Westfall et al.

[11] Patent Number: 4,883,825

[45] Date of Patent: Nov. 28, 1989

[54] PROCESS FOR THE MANUFACTURE OF LOW DENSITY, FLEXIBLE POLYURETHANE FOAMS

[75] Inventors: Paul M. Westfall, St. Albans; Frank E. Critchfield, South Charleston; William A. Gill, Hurricane, all of W. Va.

[73] Assignee: Union Carbide Chemicals and Plastics Company Inc., Danbury, Conn.

[21] Appl. No.: 139,757

[22] Filed: Dec. 30, 1987

[51] Int. Cl.$^4$ .............................................. C08G 18/14
[52] U.S. Cl. ................................... 521/112; 521/129; 521/137; 521/174; 521/176
[58] Field of Search ............... 521/129, 176, 174, 112, 521/137; 528/54

[56] References Cited

U.S. PATENT DOCUMENTS

| | | | |
|---|---|---|---|
| 3,304,273 | 2/1967 | Starnburger | 521/88 |
| 3,383,351 | 5/1968 | Starnburger | 524/762 |
| 3,523,093 | 8/1970 | Starnburger | 521/88 |
| 3,689,440 | 9/1972 | Glaesmann | 260/ |
| 3,723,366 | 2/1973 | Kan | 260/ |
| 3,741,917 | 6/1973 | Morehouse | 260/2.5 AH |
| 3,857,800 | 12/1974 | Fishbein et al. | 260/2.5 AP |
| 3,899,454 | 8/1975 | Wagner et al. | 521/159 |
| 3,981,829 | 9/1976 | Cenker et al. | 260/ |
| 4,066,580 | 1/1978 | Falkenstein et al. | 260/ |
| 4,105,595 | 8/1978 | Eisenmann et al. | 521/159 |
| 4,107,151 | 8/1978 | Takahashi et al. | 528/54 |
| 4,122,269 | 10/1978 | Chono et al. | 544/207 |
| 4,141,862 | 2/1979 | Raden et al. | 521/ |
| 4,211,849 | 7/1980 | Kollmeier et al. | 521/164 |
| 4,228,310 | 10/1980 | Speranza et al. | 568/ |
| 4,264,744 | 4/1981 | Milovanovic et al. | 521/ |
| 4,275,169 | 6/1981 | Rudner et al. | 521/ |
| 4,421,872 | 12/1983 | Büthe et al. | 521/174 |

FOREIGN PATENT DOCUMENTS

| | | |
|---|---|---|
| 2507161 | 10/1975 | Fed. Rep. of Germany . |
| 2728031 | 3/1978 | Fed. Rep. of Germany . |
| 2301554 | 7/1976 | France . |
| 2436154 | 9/1980 | France . |
| 075449 | 4/1980 | Japan . |
| 108624 | 8/1980 | Japan . |
| 075448 | 9/1980 | Japan . |
| 6815845 | 6/1967 | Netherlands . |
| 735604 | 5/1977 | U.S.S.R. . |
| 974169 | 11/1961 | United Kingdom . |
| 1398529 | 6/1975 | United Kingdom . |

OTHER PUBLICATIONS

Kallmeier et al. "Reaction Sequences and the Role of Surfactant in High Resilience Foam", J. Cellular Plastics, Nov., 1984, p. 410, CA-107:135310z Kumasaka et al.

*Primary Examiner*—Maurice J. Welsh
*Assistant Examiner*—L. Henderson
*Attorney, Agent, or Firm*—Paul W. Leuzzi

[57] ABSTRACT

A process for the manufacture of low density flexible polymethane foam via a catalyzed reaction of a highly reactive, high ethylene oxide, high functionality polyol, a hydrophilic polyhydric compound, water and polyisocyanates.

14 Claims, No Drawings

PROCESS FOR THE MANUFACTURE OF LOW DENSITY, FLEXIBLE POLYURETHANE FOAMS

BACKGROUND OF THE INVENTION

1. Field of the Invention

The present invention relates to a process for the manufacture of low density, i.e. 1 to 2 pounds per cubic foot, flexible polyurethane foam. More particularly, the instant invention involves the catalyzed reaction of: (1) high reactivity, high ethylene oxide, high functionality polyols or polyahls; (2) hydrophilic polyhydric compounds, (3) water above 4.0 parts per hundred parts, and (4) organic polyisocyanates to obtain flexible polyurethane foam with low density.

2. Description of the Prior Art

High resilience (HR) foam technology has provided improved physical foam properties and processing advantages compared with the conventional technology of foam production. The HR-foams generally possess outstanding resiliency and cushioning qualities.

The HR foam properties and processing advantages are considered to be related to the employment of highly reactive polyether or polymer polyols with more than 60 percent of primary hydroxyl groups and molecular weights from 4800 to 6500.

In the manufacture of HR foam, the production of very low density parts (below 1.5 pcf) has been very difficult to achieve. Density reduction is achieved by either increasing the water level and thus carbon dioxide evolution or by the use of chlorofluorocarbons. Because of environmental concerns with the chlorofluorocarbons, the former approach is preferred. As the water level is increased, the exotherm increases creating a large temperature gradient between the foam core and the mold surface using a conventional amine gellation catalyst. Typically as the water levels in molded foam systems has exceeded 4.0 parts per one hundred parts of polyol in a formulation it has become more difficult to make good parts. Careful control of molding conditions and certain delayed action amine catalysts have permitted some commercial systems to run at 4.5 to 4.9 water levels but higher levels have been unattainable. In order to obtain sufficient gas generation to achieve these low densities with a high water system, the level of water and isocyanate are quite high 65-75 parts of isocyanate per 100 parts of polyol for a 1.2 pcf foam (6.5 pphp water) vs 45-50 pphp for 1.8-2.0 pcf foam (4.2 pphp water). This difference results in very unstable processing conditions. The water/isocyanate (blowing) reaction generates a large amount of heat. The heat significantly increases the rate of reaction. This means that all of the reactions take place faster than they do in most current commercial systems. In particular, the gas evolution occurs so quickly and violently that it is very difficult to balance the polyol/isocyanate (gellation) reaction so that the gases can be trapped to make a foam. The net result has been shear collapse and instability around mold venting areas and in restricted areas in the mold (i.e. around fences or inserts in the mold).

The problem facing the industry was to bring the blowing reaction under control so it could be properly balanced with the gellation reaction so that foam could be formed under reasonable conditions thereby obtaining good processibility.

In addition, the coming-of-age of rapid demold systems has created a need for improved systems. Rapid demold systems operated at a 3 minute demold. At times when the carousel is not being fully utilized the demold times can be accelerated to 2.5 minutes. However, typically an indexing carousel line has 2 or 3 stations that are not utilized between the pour station and the demold station. This means that the productivity could be increased if a foam system could be developed which was cured at 1.5-2.0 minutes and still retained its ability to flow well in the mold.

A paper published by Kollmeier, et al. (Th. Goldschmidt Ag.), had described the use of glycerine in urethane foams resulting in delayed cream time.

In their article, Kollmeier, et al. refer to highly reactive polyols having more than 60% primary hydroxyl groups. However, it has now been found that the best foams are made with more highly reactive polyols (75-90+% primary hydroxyl groups). While it is possible to pour acceptable foams with lower reactive polyols, it requires more glycerine and the systems are less flexible to formulate since additional glycerine means even slower cream times. Furthermore, at high pphp water levels these products give coarse cells.

OBJECTS OF THE INVENTION

It is the primary object of the present invention to provide a process for the manufacture of flexible polyurethane foam having densities in the range of from 1 to 2 pounds per cubic foot of foam.

It is another object of the present invention to provide a process for the manufacture of such foams using very high water levels.

Another object of this invention is to develop a foam formulation for rapid demold system with improved moldability and lower demold times.

It is yet another object of the present invention to provide such low density, high water foams without the associated problems of densification and discoloration.

Other objects of this invention will become apparent from the description and examples set forth hereinafter.

SUMMARY OF THE INVENTION

The present invention provides polyurethane foam systems that can be used to extend the limits of current polyurethane foam technology to obtain commercially attractive advancements in the areas of lower densities and/or rapid demold systems. The catalyzed reaction of: (1) high reactivity, high ethylene oxide, high functionality polyols or polyahls; (2) hydrophilic polyhydric compounds, (3) water above 4.0 parts per hundred parts, and (4) organic polyisocyanates have been found to provide flexible polyurethane foam with low density, i.e., 1 to 2 pounds per cubic foot.

This discovery can also be used to improve rapid demold molded systems. The extra delay obtained from the use of polyhydric compounds allows for the use of different catalysts and still maintain moldability. The demold times can be reduced from 3-2.5 minutes down to 2-1.5 minutes. This greatly improves the productivity of a commercial foam line.

DETAILED DESCRIPTION OF THE INVENTION

The present invention provides a method for producing polyurethane foam which include reacting: (a) a highly reactive, high ethylene oxide containing, high functionality polyol or polyahl composition, (b) a hydrophilic polyhydric compound, (c) water, (d) an organic polyisocyanate in the presence of (e) a catalyst for the reaction of (a) and (d) to produce the polyurethane foam. The reaction is carried out in the presence of a foam stabilizer. The reaction and foaming operations can be performed in any suitable manner, preferably by the one-shot technique.

Polyol

The polyol, or blends thereof, employed depends upon the end use of the polyurethane foam to be produced. The molecular weight or hydroxyl number of the base is selected so as to result in flexible foams when the polyol is converted to a polyurethane. For the purpose of the present invention the polyols are characterized by having at least 75 percent, and preferably 85 percent, primary hydroxyl groups as measured by ASTM D-4273. The hydroxyl number of the polyols employed can accordingly vary over a wide range. In general, the hydroxyl number of the polyols employed may range from about 20 (or lower) to about 70 (and higher). As a further refinement, the specific foam application will likewise influence the choice of the polyol. As an example, for molded foam, the hydroxyl number of the polyol may be on the order of about 20 to about 40, and for slabstock the hydroxyl number may be on the order of about 25 to about 70.

The hydroxyl number limits described above are not intended to be restrictive, but are merely illustrative of the large number of possible combinations for the polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where

OH = hydroxyl number of the polyol
f = functionality, that is, average number of hydroxyl groups per molecule of polyol
m.w. = number average molecular weight of the polyol.

Substantially any of the polyols previously used in the art to make polyurethanes can be used as the polyol in this invention. Illustrative of the polyols useful in producing polyurethanes in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:
 (a) alkylene oxide adducts of polyhydroxyalkanes;
 (b) alkylene oxide adducts of nonreducing sugars and sugar derivatives;
 (c) alkylene oxide adducts of phosphorus and polyphosphorus acids;
 (d) alkylene oxide adducts of polyphenols;

Illustrative alkylene oxide adducts of polyhydroxyalkanes include, among others, the alkylene oxide adducts of glycerine, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6 hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, condensation productions of phenol and formaldehyde, and novolac resins; condensation products of various phenolic compounds and acrolein; the simplest member of this class being 1,2,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro 1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Indeed, any material having an active hydrogen as determined by the Zerewitinoff test may be utilized as the polyol also known as "polyahls". For example, amine-terminated polyether polyols are known and may be utilized, if desired.

The most preferred polyols employed in this invention include the poly(oxypropylene) glycols, triols, and higher functionality polyols, and the like that are capped with ethylene oxide as dictated by the reactivity requirements of the particular polyurethane application. Generally, the nominal functionality of such polyols will be in the range of about 3 to 5 or more. These polyols also include poly- (oxypropylene oxyethylene) polyols; however, desirably, the oxyethylene content should comprise less than 80 percent of the total polymer and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain. In total, the ethylene oxide content should be from 8 to 30 percent of the total polymer.

In addition to these conventional polyols, polymer/polyols may be used alone or blended with other polyols. Polymer/polyols are well known in the art. The basic patents in the field are Stamberger Re. 28,715 (reissue of U.S. Pat. No. 3,383,351) and Re. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to polyurethane foams produced therefrom higher load-bearing properties than are provided by the corresponding unmodified polyols. Also included are the polyols of the type taught in U.S. Pat. Nos. 3,325,421 and 4,374,209.

Conceptually, a wide variety of monomers may be utilized in the preparation of the polymer/polyol compositions in accordance with the invention. Numerous ethylenically unsaturated monomers are disclosed in the prior patents. Any of these monomers should be suitable.

The selection of the monomer or monomers used will depend on considerations such as the relative cost of the monomers and the polyurethane product characteristics required for the intended application. To impart the desired load-bearing to the foams, the monomer or monomers used in preparing the polymer/polyol should, of course, desirably be selected to provide a polymer which has a glass transition of at least slightly higher than room temperature. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed.

The preferred monomer mixtures used to make the polymer/polyol compositions are mixtures of acrylonitrile and styrene or acrylonitrile, styrene and vinylidene chloride.

The monomer content will be typically selected to provide the desired solids content required for the anticipated end-use application. In general, it will usually be desirable to form the polymer/polyols with as high a resulting polymer or solids content as will provide the desired viscosity and stability properties.

For typical HR foam formulations, solids content of up to about 45 weight percent or more are feasible and may be provided. In slabstock applications, the tendency is to utilize as high a solids content as possible, contents of 45 weight percent to about 50 weight percent or more being desired commercially for some applications.

Hydrophilic Polyhydric Materials

The use of polyhydric materials is primarily intended to delay the blowing reaction and to stabilize the foam. They should be very hydrophilic in nature and soluble in water, at 25° C., to the extent of at least 40% by weight, more preferably they should be completely soluble. The polyhydric compounds should be reactive towards the isocyanate radical but no more reactive than a primary hydroxyl radical, otherwise the blowing reaction will not be delayed. Suitable materials include glycerine, trimethylol propane, sorbitol, erythritol, sucrose, simple carbohydrates such as glucose and fructose, and low molecular weight polyethylene oxide polyols. Most preferably glycerine is employed. The amount of the polyhydric material employed can range from 0.1 to 5 parts per hundred parts polyol, preferably from 0.5 to 2.5 pphp.

Catalysts

One of the most difficult problems associated with the development of low density foam was that at 6.5 pphp water the foam showed evidence of scorch. Measurement of the internal temperatures created by this high water system gave 242° F.-0.5 inch from the surface and 315° F. at the center of the test pad. A standard 4.0 pphp water foam gives readings of 150° F. and 284° F. respectively. As taught in copending application, Ser. No. 139,758 filed Dec. 30, 1987, now U.S. Pat. No. 4,814,359, the use of hexahydro-s-triazines, and in particular, hexamethylenetetramine (HMT), avoids the scorch. The use of HMT also led to an open celled surface instead of the thick, papery surface obtained with other catalyst systems. This was an important discovery since a typical slabstock scorch inhibitor package did not eliminate the scorch problem. It was only controlled by replacing triethylenediamine with hexamethylenetetramine (HMT).

In addition to the hexahydro-s triazines, the tertiary amines may be used as secondary catalysts for the blowing reaction catalysts in combination with one or more of the above-noted catalysts. Metal catalysts, or combinations of metal catalysts, may also be employed as the secondary catalyst. The catalysts are employed in small amounts, for example, from about 0.001 percent to about 5 percent, based on the weight of the reaction mixture.

Any known catalysts useful in producing polyurethanes may be employed. Representative catalysts include: (a) tertiary amines such as bis(2,2'-dimethylamino)ethyl ether, trimethylamine, triethylamine, N-methylmorpholine, N-ethylmorpholine, N,N-dimethylbenzylamine, N,N-dimethylethanolamine, N,N,N',N'-tetramethyl 1,3-butanediamine, pentamethyldipropylenetriamine, triethanolamine, triethylenediamine, pyridine oxide and the like; (b) strong bases such as alkali and alkaline earth metal hydroxides, alkoxides, and phenoxides; (c) acidic metal salts of strong acids such as ferric chloride, stannic chloride, stannous chloride, antimony trichloride, bismuth nitrate and chloride, and the like; (d) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta diketones, and 2(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibutyltindilaurylmercaptide, dibutyltin bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like.

Blowing Agents

A small amount of a blowing agent is employed in the reaction mixture. Water should be used in an amount above 4.0, preferably 4.5 to 20 and most preferably 6.5 to 8, parts of water per hundred parts of polyol. The lower water levels, e.g. 40 pphp can be employed when diethanolamine is used in combination with the polyhydric materials. Additionally, a combination of water and other blowing agent may be employed. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, formic acid and the like. The preferred method of foaming for producing flexible foams is the use of water, or a combination of water plus a fluorocarbon blowing agent such as trichloromonofluoromethane. The quantity of blowing agent employed will vary with factors such as the density desired in the foamed product.

The scorch-free advantages of the foams are most evident at water levels of 5 or more parts per hundred parts of polyol. This results in a foam having a density less than 1.5 pounds per cubic foot.

Stabilizers

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British patent specification No. 1,220,471. The latter class of copolymers differs from the above-mentioned polysiloxane polyoxylakylene block copolymers in that the polysiloxane moiety is bonded to the polyoxy-alkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924.

Polyisocyanates

The organic polyisocyanates that are useful in producing polyurethane foam in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6-diisocyanatotoluene, methylene bis(4-cyclohexyl isocyanate), 1,8-diisocyanatooctane, 1,5-diisocyanato-2,2,4-trimethylpentane, 1,9-diisocyanatononane, 1,10-diisocyanatopropylether of 1,4-butylene glycol, 1,11-diisocyanatoundecane, 1,12-diisocyanatododecane bis(isocyanatohexyl) sulfide, 1,4-diisocyanatobenzene, 3,5-diisocyanato-o-xylene, 4,6-diisocyanato-m-xylene, 2,6 diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate, 2,4'-diphenyl-methylene diisocyanate, and polymethylene poly (phenyleneisocyanates), and mixtures thereof. The preferred polyisocyanates are TDI (a mixture of 80% 2,4-tolylene diisocyanate and 20%, 2,6-tolylene diisocyanate), MDI (diphenylmethane diisocyanate alone or in mixture with its polymeric forms), and mixtures of TDI with MDI.

The polyurethanes so produced may be utilized in flexible foam applications where any conventional type of flexible polyurethane is or can be utilized. The polyurethanes find particular utility in the production of high resiliency foams for use in arm rests, mattresses, automobile seats, and the like, as well as in slabstock foams for use as carpet underlayment, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

As used in the Examples, the following designations, symbols, terms and abbreviation have the following meanings:

Polyol A—A polyol made by reacting propylene oxide with glycerine in the presence of potassium hydroxide catalyst, capping with ethylene oxide and refining to remove catalyst. The polyol contains about 16.5 weight percent ethylene oxide as a cap and has a hydroxyl number of about 28.

Polyol B—A polyol made by reacting propylene oxide with glycerine in the presence of potassium hydroxide catalyst, capping with ethylene oxide and refining to remove catalyst. The polyol contains about 19 weight percent ethylene oxide as a cap and has a hydroxyl number of about 35.

Polyol C—A polyol made by reacting propylene oxide with glycerine in the presence of potassium hydroxide catalyst, capping with ethylene oxide and refining to remove catalyst. The polyol contains about 19 weight percent ethylene oxide as a cap and has a hydroxyl number of about 28.

Polyol D—A polyol made by reacting propylene oxide with glycerine in the presence of potassium hydroxide catalyst, capping with ethylene oxide and refining to remove catalyst. The polyol contains about 15 weight percent ethylene oxide as a cap and has a hydroxyl number of about 35.

Polyol E—A polyol made by reacting propylene oxide with glycerine in the presence of potassium hydroxide catalyst, capping with ethylene oxide and refining to remove catalyst. The polyol contains about 16.5 percent ethylene oxide and has a hydroxyl number of about 35.

Polyol F—A propylene/ethylene oxide adduct of butanol by Union Carbide sold as "UCON ™ Fluid 50HB5100".

Graft A—A 10 percent by weight graft of the acrylic acid on Polyol F.

Polyol G—A polyol comprising 90 percent by weight of Polyol A and 10 percent of Graft A neutralized with a 33 percent solution of KOH.

Polyol H—A nine mole adduct of ethylene oxide on nonyl phenol.

Polymer/Polyol A—A polymer/polyol sold by Union Carbide Corporation as "NIAX Polyol E-650". It contains 33 weight percent polymer and has a hydroxyl number of 24.

Polymer/Polyol C—A polymer/polyol sold by Union Carbide Corporation as "NIAX Polyol 34 -28". It contains 22.5 percent polymer and has hydroxyl number of 28.

TMP—Trimethylol propane.
HMT—hexamethylenetetramine
HMT-G—a 15 percent solution of HMT in glycerine Catalyst A—A polyurethane foam triethylenediamine catalyst sold as "NIAX Catalyst A-33" by Union Carbide Corporation.

Catalyst B—a polyurethane foam pentamethyldipropylenetriamine catalyst sold as "Polycat 77" by Air Products Corporation.

Catalyst C—A polyurethane foam bis-(2-dimethylaminoethyl)ether catalyst sold as "NIAX Catalyst A-1" by Union Carbide Corporation.

Catalyst D—dibutyltin dilaurylmercaptide

Surfactant A—A silicone surfactant sold for use in high resiliency foam by Union Carbide Corporation as "Silicone Surfactant Y-10,459".

Surfactant B—A silicone surfactant sold for use in high resiliency foam by Union Carbide Corporation as "Silicone Surfactant Y-10,515".

Surfactant C—a silicone surfactant sold for use in high resiliency foam by Union Carbide Corporation as "Silicone Surfactant Y-10,366".

TDI—A mixture of 80 weight percent 2,4-diisocyanatotoluene and 20 weight percent 2,6-diisocyanatotoluene.

Cream Time—is the time from the addition of the isocyanate during mixing of the components until the visible movement or expansion of the foam mixture begins.

Exit Time—is the time when the foaming mixture first begins to extrude from the vent holes in the mold.

Vent Collapse—is the sum of the area of the large cells or voids that can occur in the foam at the four 1/16" vent holes in the rectangular mold.

Density—Density in pounds per cubic foot (ASTM D 3574, Test A).

IFD, 25%—Indentation Force Deflection, 25% (ASTM D-3574, Test B1 and Test B2).

IFD, 50%—Indentation Force Deflection, 50% (ASTM D 3574, Test B1 and Test B2).

Tensile—Tensile in psi (ASTM D 3574, Test E).

Elongation—Elongation in percent (ASTM D 3574, Test E).

Tear—Tear Resistance in pounds per inch (ASTM D 3574, Test F).

Comp. Set, 75% Compression Set, 75% (ASTM D 3574, Test D).

HACS, 50%—Humid Age Compression Set, 50% (ASTM D 3574, Test D).

PROCEDURE

Prior to preparing the foaming mixture it was necessary to prepare the mold properly. The mold was heated to above 165° F. in a forced air oven (250° F.), then removed from the oven and sprayed with mold release. The mold was then cooled to 130° F. to 160° F. depending on the optimum temperature for a given formulation. The preparation of the foaming mixture was timed so that the mold was at or near optimum temperature at the time of pour.

Each formulation was prepared by first mixing all of the ingredients except the TDI at 4000 rpm for 55 seconds. After mixing was stopped the correct level of TDI was added quickly. Then the mixer was started and the mixing at 4000 rpm was continued for 5 seconds. After the mixing was completed the contents of the mixing container were immediately poured into a waxed, heated (130° 160° F.) aluminum mold (15"×15"×5") provided with a lid hinged to the mold and four vent holes of 1/16 inch in diameter drilled close to each corner of the lid. The lid is provided with a latch for holding it in closed position. After pouring the resultant mixture into the mold the lid was closed and latched. The mixture in the mold was allowed to foam and fill the mold. Some of the foam extruded through the four vent holes. The foam was allowed to set for 2 minutes from pour and then placed in a 250° F., forced air oven for 3 minutes. The foam was demolded after a total of 2 to 5 minutes from pour. The foam part was immediately hand crushed and then passed 3 times through crushing rollers (90% crush). After the crushing step the foam part was placed in a forced air oven at 250° F. for a 30 minute postcure period. The parts were then placed in a constant temperature (72° F.) constant humidity (50% RH) room and conditioned for 24 hours before testing for physical properties.

EXAMPLES 1 TO 15

The following examples were run using the formulations shown in the tables below while following the procedure set forth above.

TABLE I

| RAPID DEMOLD SYSTEMS DIETHANOLAMINE VS GLYCERINE | | |
|---|---|---|
| | PARTS BY WEIGHT | |
| COMPONENT | EXAMPLE A | EXAMPLE 1 |
| Polyol B | 50 | 50 |
| Polymer/Polyol A | 50 | 50 |
| Water | 4.0 | 4.0 |
| Diethanolamine | 1.0 | 0.5 |
| Glycerine | — | 0.5 |
| Catalyst C | 0.15 | 0.15 |
| Catalyst A | 0.55 | 0.55 |
| Catalyst D | 0.01 | 0.01 |
| Silicone Surfactant C | 1.40 | 1.40 |
| Graft A | 0.8 | 0.8 |
| Toluene Diisocyanate (103 Index) | 46.92 | 47.1 |
| Cream Time, sec. | 5 | 6.5 |
| Exit Time, sec. | 30 | 30 |
| Vent Loss, grams | 14.3 | 13.9 |
| Demold Time, minutes | 2 | 2 |
| Cure | Low Green Strength | Good Part |

TABLE II

STANDARD MOLDED FOAM SYSTEMS DIETHANOLAMINE VS TRIMETHYLOL PROPANE (TMP)/SUCROSE

| COMPONENT | PARTS BY WEIGHT | |
|---|---|---|
| | EXAMPLE B | EXAMPLE 2 |
| Polyol B | 60 | 60 |
| Polymer/Polyol A | 40 | 40 |
| Water | 4.0 | 4.0 |
| Diethanolamine | 1.0 | 0.5 |
| TMP/Sucrose 25/75 | — | 1.0 |
| Catalyst C | 0.13 | 0.13 |
| Catalyst A | 0.35 | 0.35 |
| Catalyst D | 0.005 | 0.005 |
| Silicone Surfactant C | 1.4 | 1.4 |
| TDI (105 Index) | 48.07 | 48.87 |
| Cream Time, sec. | 9.0 | 11 |
| Exit Time, sec. | 38 | 43 |
| Vent Loss, grams | 8.3 | 15.3 |
| Notes | Medium Tight | Tight |

TABLE III

RAPID DEMOLD SYSTEMS

| COMPONENT | PARTS BY WEIGHT | | | |
|---|---|---|---|---|
| | EXAMPLE 2 | EXAMPLE 3 | EXAMPLE 4 | EXAMPLE 5 |
| Polyol B | 50 | 50 | 50 | 50 |
| Polymer/Polyol A | 50 | 50 | 50 | 50 |
| Water | 4.0 | 4.0 | 4.0 | 4.0 |
| Diethanolamine | 0.3 | 0.3 | 0.3 | 0.3 |
| Trimethylol Propane | 1.0 | | | |
| Sorbitol | | 1.0 | | |
| Erythritol | | | 1.0 | |
| Sucrose | | | | 1.0 |
| Catalyst C | 0.20 | 0.20 | 0.20 | 0.20 |
| Catalyst A | 0.60 | 0.60 | 0.60 | 0.60 |
| Catalyst D | 0.015 | 0.015 | 0.015 | 0.015 |
| Silicone Surfactant C | 1.40 | 1.40 | 1.40 | 1.40 |
| Graft A | 0.8 | 0.8 | 0.8 | 0.8 |
| TDI (103 Index) | 47.14 | 48.09 | 48.07 | 47.23 |
| Cream Time, sec. | 5 | 11 | 11 | 8 |
| Exit Time, sec. | 27 | 32 | 32 | 35 |
| Vent Loss, grams | 19.4 | 20.8 | 20.9 | 22.8 |
| Comments | Very Fast | Slow | Slow | Slow Vent Collapse |

TABLE IV

DIETHANOLAMINE VS GLYCERINE

| COMPONENT | PARTS BY WEIGHT | |
|---|---|---|
| | EXAMPLE C | EXAMPLE 6 |
| Polyol B | 80 | 80 |
| Polymer/Polyol A | 20 | 20 |
| Water | 6.5 | 6.5 |
| Diethanolamine | 1.7 | — |
| Catalyst C | 0.05 | 0.05 |
| Catalyst A | 0.75 | 0.75 |
| Catalyst D | 0.02 | 0.02 |
| Graft A | 0.4 | 0.5 |
| Silicone Surfactant A | 2.0 | 1.6 |
| Glycerine | — | 1.6 |
| TDI (100 Index) | 72.11 | 72.43 |
| Cream Time, sec. | 6 | 8 |
| Exit Time, sec. | 33 | 43 |
| Vent Extrusion wt., grams | 8.8 | 11.2 |
| Vent Collapse | Some Collapse | O.K. (½ inch) |

TABLE V

EFFECT OF POLYOL REACTIVITY

| COMPONENT | PARTS BY WEIGHT | | |
|---|---|---|---|
| | EXAMPLE D | EXAMPLE E | EXAMPLE 7 |
| Polyol D | 80 | XX | XX |
| Polyol E | XX | 80 | XX |
| Polyol B | XX | XX | 80 |
| Polymer/Polyol C | 20 | 20 | XX |
| Polymer/Polyol A | XX | XX | 20 |
| Water | 6.5 | 6.5 | 6.5 |
| HMT-G | 2.5 | 2.5 | 2.5 |
| Catalyst C | 0.09 | 0.09 | 0.09 |
| Catalyst B | 0.45 | 0.45 | 0.45 |
| Catalyst C | 0.006 | 0.006 | 0.006 |
| Silicone Surfactant B | 2.5 | 2.5 | 2.5 |
| TDI (100 Index) | 74.06 | 73.88 | 73.85 |
| Cream Time, sec. | 11 | 10 | 11 |
| Exit Time, sec. | 39 | 35 | 36 |
| Comments | Coarse Cells | Coarse Cells | Uniform Cells |
| Vent Collapse | 5 inches | ¼ inch | None |

TABLE VI

DIETHANOLAMINE/GLYCERINE BLENDS

| COMPONENT | PARTS BY WEIGHT | | | |
|---|---|---|---|---|
| | EXAMPLE F | 8 | 9 | 10 |
| Polyol D | 50 | 50 | 50 | 50 |
| Polymer/Polyol C | 50 | 50 | 50 | 50 |
| Water | 4.0 | 4.0 | 4.0 | 4.0 |
| Diethanolamine | 1.5 | 0.25 | 0.50 | 0.75 |
| Glycerine | — | 1.25 | 1.00 | 0.75 |
| Catalyst C | 0.15 | 0.15 | 0.15 | 0.15 |
| Catalyst A | 0.40 | 0.40 | 0.40 | 0.40 |
| Catalyst D | 0.007 | 0.007 | 0.007 | 0.007 |
| Silicone Surfactant C | 1.40 | 1.40 | 1.40 | 1.40 |
| TDI (110 Index) | 52.01 | 52.49 | 52.40 | 52.30 |
| Cream Time, sec. | 5 | 6 | 6 | 5 |
| Exit Time, sec. | 39 | 41 | 39 | 38 |
| Vent Loss, grams | 1.60 | 7.75 | 3.9 | 5.4 |
| Tightness | Collapse | S. Tight | S. Tight | Open |

TABLE VII

ONE POUND PER CUBIC FOOT MOLDED FOAM

| COMPONENTS | EXAMPLE 11 PARTS BY WEIGHT |
|---|---|
| Polyol B | 60 |
| Polyol A | 20 |
| Polymer/Polyol A | 20 |
| Water | 6.5 |
| Diethanolamine | 0.60 |
| Catalyst C | 0.30 |
| Catalyst A | 0.50 |
| Polyol G | 1.50 |
| Silicone Surfactant C | 1.00 |
| Silicone Surfactant A | 0.8 |
| Graft A | 0.60 |
| Glycerine | 0.80 |
| Union Carbide Blowing Agent U-11[C] | 5.0 |
| TDI (100 Index) | 69.82 |
| Cream Time, sec. | 6 |
| Exit Time, sec. | 35 |

TABLE VIII

TRIMETHYLOL PROPANE/SUCROSE BLENDS

| COMPONENT EXAMPLE | PARTS BY WEIGHT | |
|---|---|---|
| | 12 | 13 |
| Polyol B | 80 | 80 |
| Polymer/Polyol A | 20 | 20 |
| Water | 6.5 | 6.5 |
| Diethanolamine | 0.6 | 0.6 |
| Catalyst C | 0.3 | 0.3 |
| Catalyst A | 0.5 | 0.5 |

TABLE VIII-continued
TRIMETHYLOL PROPANE/SUCROSE BLENDS

| COMPONENT | PARTS BY WEIGHT | |
|---|---|---|
| EXAMPLE | 12 | 13 |
| Polyol G | 1.5 | 1.5 |
| Silicone Surfactant C | 1.3 | 1.3 |
| Silicone Surfactant A | 0.5 | 0.5 |
| Graft A | 0.6 | 0.6 |
| Sucrose | 0.4 | 0.2 |
| Trimethylol Propane | 0.4 | 0.6 |
| TDI (100 Index) | 71.04 | 71.06 |
| Cream Time, sec. | 5 | 6 |
| Exit Time, sec. | 29 | 34 |
| Comments | Surface Collapse | Good Part |

TABLE IX
CATALYST A VS HEXAMETHYLENETETRAMINE FORMULATIONS AND RESULTS

| COMPONENT | PARTS BY WEIGHT | |
|---|---|---|
| EXAMPLE | G | 14 |
| Polyol B | 60 | 60 |
| Polymer/Polyol A | 20 | 20 |
| Polyol A | 20 | 20 |
| Water | 6.0 | 6.0 |
| Diethanolamine | 0.6 | 0.6 |
| Glycerine | 0.8 | 0.8 |
| Catalyst C | 0.25 | 0.25 |
| Catalyst A | 0.55 | XX |
| HMT | XX | 0.667 |
| Catalyst D | 0.01 | |
| Silicone Surfactant C | 1.3 | 1.3 |
| Silicone Surfactant A | 0.5 | 0.5 |
| Polyol H | 0.5 | 0.5 |
| Polyol G | 1.5 | 1.5 |
| Graft A | 0.5 | 0.5 |
| TDI (100 Index) | 66.58 | 66.58 |
| Cream Time, sec. | 8 | 10 |
| Exit Time, sec. | 26 | 50 |
| Comments | Scorch | No Scorch |

TABLE X

| COMPONENTS | EXAMPLE 15 PARTS BY WEIGHT |
|---|---|
| Polyol B | 25 |
| Polymer/Polyol A | 20 |
| Polyol C | 55 |
| Water | 6.5 |
| HMT-G | 2.0 |
| Catalyst C | 0.094 |
| Catalyst B | 0.242 |
| Catalyst D | 0.005 |
| Silicone Surfactant B | 2.0 |
| TDI | (100 Index) |
| Density, pcf. | 1.25 |
| IFD, lbs/50 in$^2$ | |
| 25% Defl. | 25 |
| 50% Defl. | 45 |
| Tensile Strength, psi | 17.5 |
| Elongation, % | 85 |
| Comp. Set, % (75%) | 13 |
| HACS. % (50%) | 32 |
| Tear Resist., lbs/in | 1.23 |

We claim:

1. A process for the manufacture of low density, flexible polyurethane foams which comprises reacting:
   (a) a polymer/polyol formed insitu in a polyether polyol having at least 85 percent primary hydroxyl groups, a nominal functionality of at least three, and an ethylene oxide content of from 8 to 30 percent of the polyether polyol;
   (b) 0.1 to 5 parts per hundred parts of polyol of a polyhydric material selected from the group consisting of glycerine, trimethylol propane, sorbitol, erythritol, sucrose, simple carbohydrates, and low molecular weight polyethylene oxide polyols which is reactive with isocyanate groups but not more reactive with an isocyanate group than are the primary hydroxyl groups on the polyether polyol (a), said polyhydric material also being sufficiently hydrophillic so as to be at least 40 weight percent soluble in 25° C. water;
   (c) water in an amount from 4.0 to 20 parts per hundred parts of polyol;
   (d) an organic polyisocyanate; and
   (e) 0.001 to 5 percent, based on the weight of (a), b, c and d, of a catalyst for the reaction of (a) and (d) in the presence of a foam stabilizer.

2. The process of claim 1 wherein the polyhydric material is completely water soluble at 25 C.

3. The process of claim 1 wherein the polyhydric material is glycerine.

4. The process of claim 1 wherein the polyhydric material is employed in an amount equal to 0.5 to 2.5 parts per hundred parts of polyol.

5. The process of claim 1 wherein the water level employed ranges from 6.5 to 8 parts per hundred parts of polyol.

6. The process of claim 1 wherein the catalyst is hexamethylenetetramine.

7. The process of claim, 6 wherein the hexamethylenetetramine is dissolved in glycerine.

8. The process of claim 1 wherein the organic polyisocyanate is TDI, MDI or a mixture thereof.

9. The process of claim 1 wherein the foam stabilizer is a polysiloxane-polyoxyalkylene block copolymer.

10. The process of claim 9 wherein the foam stabilizer is employed in an amount ranging from 0.001 to 5.0 percent based on the weight of the reaction mixture.

11. The process of claim 1 wherein the foam density is less than 2.0 pounds per cubic foot.

12. A flexible polyurethane foam manufactured by the process of claim 1.

13. The polyurethane foam of claim 12 is having a foam density of less than 2.0 pounds per cubic foot.

14. The process of claim 13 wherein the foam density is no greater than 1.5 pound per cubic foot.

* * * * *